United States Patent [19]

Jaegers

[11] 3,812,752
[45] May 28, 1974

[54] SAW FOR COLD METALS

[75] Inventor: Leopold Jaegers, Euskirchen/Rhld, Germany

[73] Assignee: Trennjaeger Maschinen und Saegefabrik, Euskirchen/Rhineland, Germany

[22] Filed: Sept. 1, 1971

[21] Appl. No.: 180,237

[30] Foreign Application Priority Data
Sept. 3, 1970 Germany.......................... 2043599

[52] U.S. Cl.................. 83/478, 83/676, 83/675
[51] Int. Cl..................... B23d 19/00, B26d 1/12
[58] Field of Search............ 83/470, 478, 591, 676, 83/675, 835; 143/160 R, 159 G

[56] References Cited
UNITED STATES PATENTS
775,477   11/1904   Norlin.......................... 143/160 R
1,704,581   3/1929   Smith........................... 143/160 R
3,674,065   7/1972   Fairfield et al................. 143/160 R FOREIGN PATENTS OR APPLICATIONS
641,772   8/1950   Great Britain.................. 143/159 G Primary Examiner—Andrew R. Juhasz
Assistant Examiner—Leon Gilden
Attorney, Agent, or Firm—Burgess, Dinklage & Sprung

[57] ABSTRACT

Improved cold saw for metals utilizing a vertically displaceable circular saw blade and transmission therefor whereby the saw blade is positioned between guide means on each side of the major plane thereof. Each guide means has four points of contact with the major surface of the saw directed toward it consisting of two above and two below the saw axis and two in front and two behind the saw axis.

2 Claims, 4 Drawing Figures

SAW FOR COLD METALS

This invention relates to circular saws. It more particularly refers to vertically displaceable circular cold saws of large diameter used for cutting metal.

It is desirable to increase the output of a circular saw by increasing the blade diameter. It is also desirable to accomplish this without increasing the blade thickness. Ordinarilly, such an increase in the sawblade diameter while maintaining the sawblade thickness substantially the same would cause the sawblade to deform during the sawing operation.

In the case of hot saws for metals, i.e., saws whose blades have a very large diameter, small thickness and high peripheral speed, the proposal was made in German Patent 826,231 to provide guiding means on both sides of the sawblade adjacent the cutting point. The same proposal was repeated in German Patent 855,036 for metal cutting saws in general. According to this proposal, a relatively thin sawblade is provided with guide means ahead or in back of the cutting point between two guiding surfaces pressed resiliently against one another and preferably having the shape of annular surfaces which support the sawblade up to a point just below the teeth, that is along the whole radius except the cutting point.

Such systems have not yet been adopted in practice. The reason probably is that guiding a sawblade in the area just ahead or just in back of the cutting point does not produce the desired prevention of fluttering and deformation of the sawblade. Further, guides which are in contact, under resilient pressure, with virtually the entire periphery of the sawblade cannot be effectively used because under normal operating conditions they cannot be prevented from contacting the sawblade in an irregular manner, this irregular contact causes both the guiding means and the sawblade to overheat.

This invention is directed to the very specific problem of guiding cold saws for metals having a circular sawblade which are fed downwardly together with their attendant movable housings and which are suitable for the rapid sawing of metal pieces of large cross section. Since such sawblades are relatively thick, they are not so easily inclined to flutter and deform as are the blades of hot saws.

It is therefor an important object of the invention to prevent not only fluttering and deformation but also overheating in the case of such saws, while using thinner sawblades.

Other and additional objects of this invention will become apparent from a consideration of this entire specification including the claims and the drawing hereof.

In accord with and fulfilling these objects, one aspect of this invention resides in the use of guiding means on each side of the circular sawblade which contacts the blade at four points distributed over the periphery of the sawblade in such a manner that two are located above, two below, two in front and two behind the sawblade axis. Each guide means consists of two guide plates whose distance one from the other is adjustable.

Since it is readily possible to adjust each of these guide plate guiding means precisely in relation to the sawblade, it is possible to prevent the guides from contacting the sawblade with different pressures at different points. Furthermore, it is practical to arrange such guides such that they do not interfere with the installation and removal of the sawblade.

In a preferred embodiment of this invention, the guide plates which are located on the side of the sawblade facing away from the movable housing are fastened to a supporting plate, while the two opposite guide plates are fastened to a bar.

Understanding of this invention will be facilitated by reference to the accompanying drawing in which.

Figure 1:
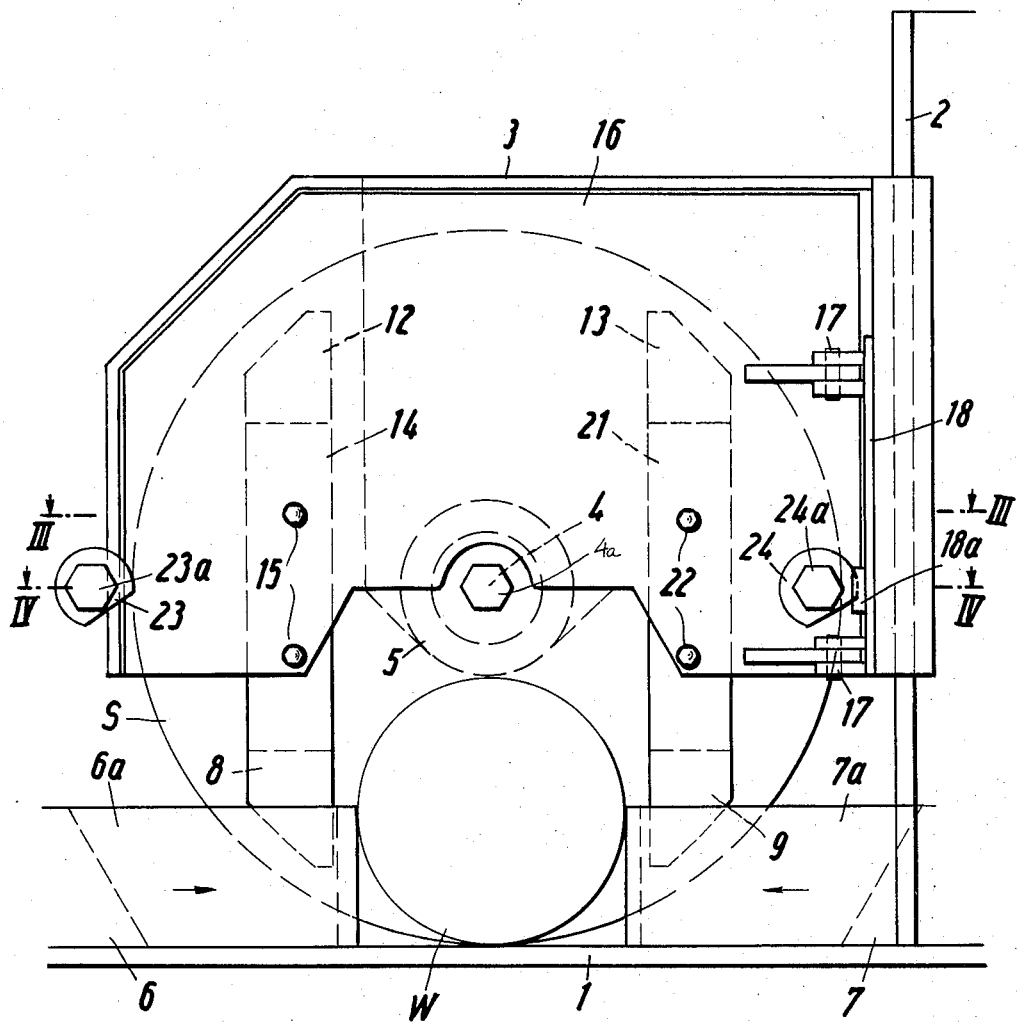
FIG. 1 is a side elevational view of the saw of this invention.
Figure 2:
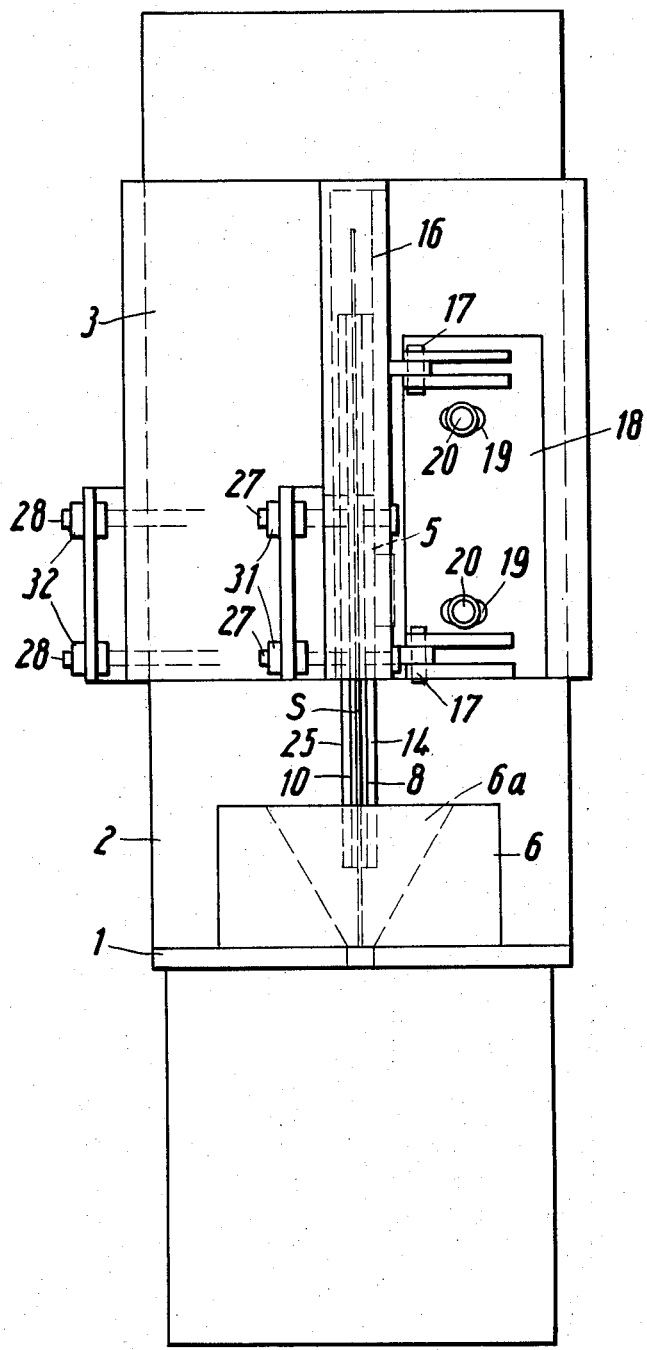
FIG. 2 is a front view thereof.

The saw assembly comprises a base plate 1, a vertical guide 2 for the movable housing 3, and a sawblade S, adapted to be driven about a horizontal axis 4 held to the drive shaft by a holding member 5. The workpiece to be cut W is held on the base plate 1 by jaws 6 and 7 of a vise. The sawblade S is thus capable of being fed into the workpiece W vertically along the guide 2. FIG. 1 shows the position of the sawblade S and the movable housing 3 after a workpiece W has been cut through.

Figure 3:
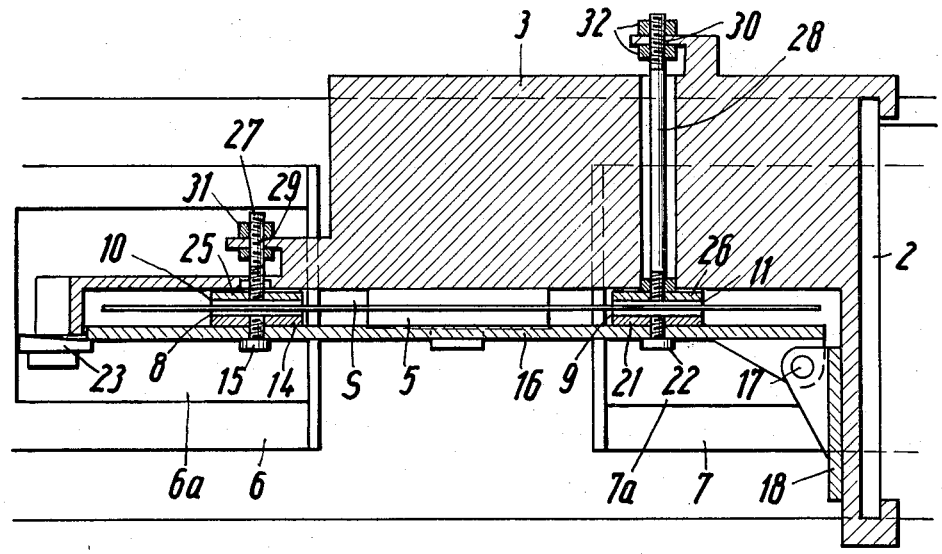
FIG. 3 is a section taken on line III—III in FIG. 1 looking in the direction of the arrows.
Figure 4:
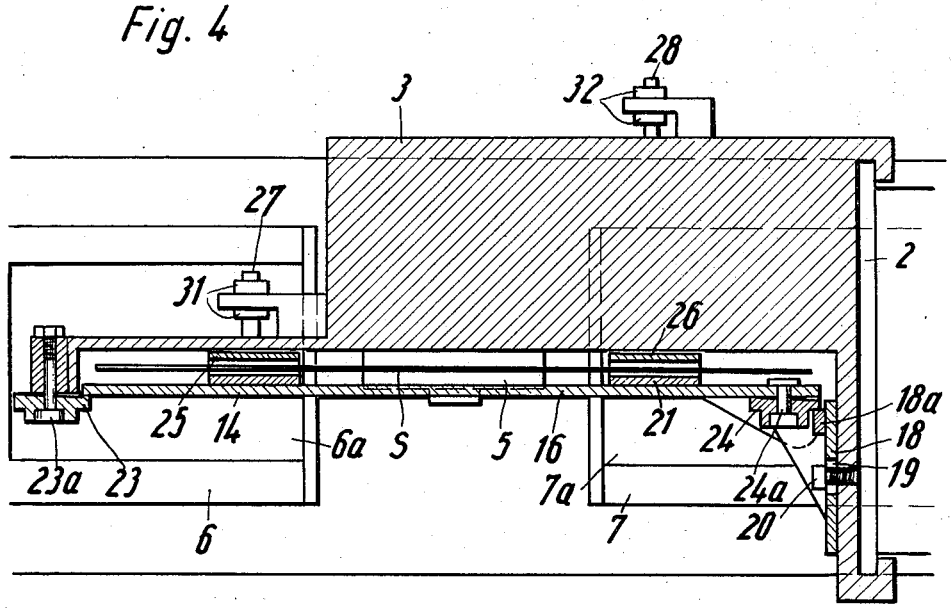
FIG. 4 is a section taken along line IV—IV in FIG. 1 looking in the direction of the arrows.

To keep the sawblade precisely in its proper cutting plane, it is held by two pairs of guide plates 8–9 and 10–11 at two points which, after the severance of a round workpiece W of maximum diameter, are located close to the workpiece (see especially FIGS. 3 and 4). Similar pairs of guide plates are provided vertically above the plates 8–9 and 10–11, preferably at about the same distance from axis 4. Of these only one pair of guide plates 12 and 13 are seen in FIG. 1. Friction plates 8 to 13 can be made of an impregnated hard fabric. The guide plates 8 and 12 are preferably fastened by riveting and cementing to a vertical bar 14 which is fastened by means of screws 15 to a holding plate 16 which is hinged to a mounting plate 18 by means of bolts 17. The mounting plate 18 has elongated holes 19 and is fastened to the movable housing 3 by means of bolts 20 in these elongated holes (see FIG. 4). The guide plates 9 and 13 are likewise fastened to a vertical bar 21 which in turn is affixed to holding plate 16 by means of screws 22. The guide plates 8, 9, 12 and 13 are urged by the holding plate 16 against the front face of the sawblade S which is averted from the movable housing. At the same time the holding plate 16 is held by a rotating wedge 23 which preferably has a hexagonal recess 23a equal to the hexagonal recess 4a in the saw washer 5. A corresponding rotating wedge 24 having a hexagonal recess 24a is located on the diametrically opposite side of the holding plate 16 and engages a lug 18a on the mounting plate 18. By means of these two rotating wedges 23 and 24 the guide plates 8, 9, 12 and 13 contacting the front face of the sawblade S can be finely adjusted.

The guide plates located on the back side of the sawblade, of which FIGS. 3 and 4 show only the lower guide plates 10 and 11, are fastened like the front guide plates 8, 9, 12 and 13 onto bars 25 and 26 of the same shape and position as bars 14 and 21. They are provided with threaded bolts 27 and 28, respectively, whose threads mate with the threaded bores 29 and 30, respectively, and can be locked by lock nuts 31 and 32, respectively. The threaded bolt 28 passes through the entire width of the movable housing. The position of the guide plates 10 and 11 in relation to the sawblade S can be adjusted by means of the threaded bolts 27 and 28.

Each of the vise jaws 6 and 7 has a cut-out 6a and 7a, respectively, into which the sawblade S and the guide plates 8–11 as well as the bottom ends of bars 14 and 21 and 25 and 26 can plunge upon the vertical descent of the sawblade. All that is necessary for this purpose is to release the holding plate 16 by turning the rotatory wedge, swing it open on the hinge bolts 17, and remove the saw washer 5 with the same wrench that was used to turn the rotatory wedge 24. The arrangement is furthermore such that it provides sufficient room for a vertical vise whereby the workpiece is held between the two jaws 6 and 7 on the holding plate 16.

What is claimed is:

1. Saw for cold metals comprising a circular sawblade, drive means for said sawblade, a housing for said means, frictional means for guiding and displacing said sawblade along a vertical plane and guiding means for each side of said circular sawblade, wherein said guiding means contacts each of the opposite sides of the circular sawblade at four points distributed over the periphery of the sawblade in such a manner that two are above and two below the sawblade axis and two are in front and two are behind the sawblade axis, and wherein each guiding means consists of two guide plates, the guide plates which lie on the side of the sawblade that is averted from said housing being fastened to a holding plate, wherein one end of said holding plate is fastened to said housing by a hinge and another end of said holding plate is adapted to be locked to said housing.

2. A saw according to claim 1 wherein each of said ends of said holding plate is adjustable in a direction vertical to the face of the saw blade.

* * * * *